United States Patent [19]

Oshima et al.

[11] Patent Number: 4,526,143
[45] Date of Patent: Jul. 2, 1985

[54] DIRECT INJECTION INTERNAL COMBUSTION ENGINE OF COMPRESSION IGNITION TYPE

[75] Inventors: Yujiro Oshima; Taro Aoyama, both of Aichi, Japan

[73] Assignee: Kabushiki Kaisha Toyota Chuo Kenkyusho, Aichi, Japan

[21] Appl. No.: 526,841

[22] Filed: Aug. 26, 1983

[30] Foreign Application Priority Data

Aug. 27, 1982 [JP] Japan .............................. 57-149620

[51] Int. Cl.³ .............................................. F02B 31/00
[52] U.S. Cl. ..................................... 123/301; 123/262; 123/279; 239/474
[58] Field of Search ............ 123/301, 279, 262, 52 M, 123/188 M; 239/48, 464, 472, 474, 452, 460

[56] References Cited

U.S. PATENT DOCUMENTS 2,110,365  3/1938  Imfeld ................................... 239/474
4,207,843  6/1980  List et al. ............................. 123/279

FOREIGN PATENT DOCUMENTS 0251007  5/1943  Fed. Rep. of Germany ...... 123/279
0594070  5/1959  Italy ..................................... 123/262
109507   8/1979  Japan ................................... 123/301
13215    1/1982  Japan ................................... 123/301
2000222  1/1979  United Kingdom ................ 123/301

Primary Examiner—Parshotam S. Lall
Attorney, Agent, or Firm—Sughrue, Mion, Zinn, Macpeak & Seas

[57] ABSTRACT

A direct injection internal combustion engine of compression ignition type is provided with a piston cavity offset from the piston center and with an injection nozzle which injects a hollow conical fuel spray having a tangential velocity component and relatively weak penetration into a swirl set up in the combustion chamber. The injection geometry and the offset are such that squish and swirl flows interact to form an excellent air-fuel mixture over the whole volume of the cavity without forming local fuel concentrations or wetting the cavity wall.

14 Claims, 8 Drawing Figures

DIRECT INJECTION INTERNAL COMBUSTION ENGINE OF COMPRESSION IGNITION TYPE

BACKGROUND OF THE INVENTION

The present invention relates to an injection internal combustion engine of a compression ignition type in which fuel is injected directly into a cavity formed in a piston top surface.

Direct injection internal combustion engines of a compression ignition type, in which the combustion chamber is constructed by forming a recess (which will shortly be referred to as a "cavity") in the piston top surface, are frequently used as large-sized engines because these have such an advantage over similar engines having a swirl chamber or a precombustion chamber in that in the direct injection internal combustion engine there is no connecting hole between the different chambers, and a low compression ratio is allowed, so that frictional loss and accordingly the specific fuel consumption of the engine can be reduced.

In a small-sized engine having a small cylinder diameter, however, the direct injection internal combustion engine of a compression ignition type encounters more problems in the formation of the air-fuel mixture than in the large-sized engine.

In a direct injection internal combustion engine according to the prior art, more specifically, the fuel injection nozzle is arranged at the center of a cavity formed in the top surface of the piston so that it may inject a plurality of fuel sprays radially from its plural injection ports. A swirling flow (or a swirl), which is generated by the port or the like of an intake valve during the suction stroke of the engine, still exists even at the end of the compression stroke, so that the mixture is formed while carrying the fuel spray in the swirling direction in the cavity. The diameters of cavities in common use are within a range of 40 to 70% of that of the piston. Thus, a small-sized engine equipped with a piston having a diameter of 100 mm or less reduces the diameter of the cavity C, and this cavity diameter becomes smaller if the compression ratio is made higher. As a result, the fuel sprays injected radially from the plural injection ports of the fuel injection nozzle FIG. 4 collide upon the inner wall surface of the cavity so that they either stick as a liquid film to the wall surface or reside thereon as coarse droplets, to thereby reduce the effective mixture. This in turn results in the failure of effective combustion to thereby invite a reduction in the output power, a degradation of fuel economy, the generation of smoke, and an increase in the hydrocarbons in the exhaust gases.

In order to prevent the fuel from impinging upon the cavity wall surface, the following methods have been generally used: (a) a method by which the swirling flow formed in the combustion chamber is intensified; (b) a method by which the injection ports of the fuel injection nozzle have their size reduced but are increased in number; or (c) a method by which the compression ratio is increased to raise the pressure (or air density) in the cavity at the fuel injecting timing to thereby reduce the spray penetration of the fuel injection nozzle.

Method (a) raises a problem in that if the swirl ratio is increased in a small-sized engine, the fluid resistance of the intake port is increased so that the air charging efficiency of the engine is degraded.

Method (b) raises problems in that the injection ports are liable to be clogged, and the sprays injected from adjoining injection ports are carried by the swirling flow so as to merge in the vicinity of the inner wall of the cavity, so that an overrich region of fuel is partially established to cause smoking.

Method (c) raises a problem in that there is a limit to the reduction in the clearance between the cylinder head and the piston top surface as it does not contribute to combustion. The limit is so severe, especially for a small-sized engine, as to make it difficult to avoid problems due to the thermal expansion of the engine components and in assembling and adjusting the engine.

SUMMARY OF THE INVENTION

In order to solve the aforementioned-problems concomitant with the small-sized direct injection internal combustion engine of a compression ignition type according to the prior art, we, the inventors, have conducted systematic experiments, analyses and trial manufactures and have succeeded in reaching the present invention.

It is an object of the present invention to provide a direct injection internal combustion engine of a compression ignition type in which the fuel sprays are prevented from impinging upon the inner wall of the cavity and from merging into one another, even with a small cylinder diameter, so that a satisfactory air-fuel mixture may be formed and reduced specific fuel consumption may be attained.

According to the present invention, there is provided a direct injection internal combustion engine of a compression ignition type, in which fuel is injected into air supplied to a combustion chamber and compressed by a piston so that it may be ignited and burned, comprising an intake mechanism supplying a swirling mechanism for swirling the intake air into said combustion chamber; a combustion chamber defined by forming a semispherical cavity in the top surface of said piston and by offsetting the center of said cavity with respect to the central axis of said piston top surface with such an eccentricity $Os$ as satisfies the following relationship, where $D$ is the diameter of said piston:

$$0.02 < Os/D < 0.15:$$

and a fuel injection nozzle having fuel swirling means for injecting a fuel spray having a large tangential velocity component with respect to the axis of a injection port and an axial velocity along the forward direction of the swirling flow of intake air formed in said cavity.

The internal combustion engine having the construction thus far described according to the present invention carries the fuel spray in a swirling flow and disperses it over the entire circumference in the circumferential direction of the cavity forming the combustion chamber, partially by generating a swirling flow having a predetermined swirl ratio within the cavity by means of the swirling mechanism of the intake mechanism and partially by injecting a fuel spray of low penetration and having a tangential velocity component into the cavity, in which the swirling flow has been generated, in the forward direction of the swirling flow. According to the present invention, moreover, since the cavity is eccentrically formed in the piston top surface, the fuel spray injected from the fuel injection nozzle has its position in the cavity controlled by differentiating the intensities of the squish flows which flow from the whole circumference into the cavity, so that it may approach the inner wall, while being prevented from contacting the cavity inner wall and from being distributed across the center of the cavity, whereby smoking can be prevented by preventing any overrich region of fuel from being formed. According to the present invention, still moreover, the swirling flow, having a circumferential velocity component, and the squish flows, having their velocity components differentiated in the direction of the depth of the cavity, are made to properly collide in the cavity so that the mixing between the injected fuel and the air is improved so as to form a satisfactory mixture. Since a satisfactory mixture is formed in the aforementioned manner over the whole volume of the cavity, the present invention provides an advantage in that efficient combustion can be ensured with a minimum of fuel to restrain smoking and the emission of hydrocarbons, particulates or carbon monoxide.

We have fabricated a plurality of pistons, in which the cavity C was formed with a variety of eccentricites Os with respect to the center of the top surface of piston P, as shown in FIG. 1, and have determined the following relationship between the eccentricity Os of the cavity C and the diameter D of the piston P which ensures the operational effects of the present invention, and as effectively differentiates the intensities of squish flows S which flow circumferentially into the cavity C:

$$0.02 < Os/D < 0.15.$$

More specifically, when the air in the cylinder is compressed by the piston after the intake stroke of the engine, the intake air, which has been swirled by the intake mechanism or the like, has its swirling center made coincident with the cylinder center as the piston located generally at the center of the cylinder is raised to advance the compression stroke. When the piston reaches the vicinity of top dead center, the swirling air in the cylinder flows into the cavity 2 of the piston 1. As a result, the center of the swirling air shifts to the offset center of the cavity. For larger shifts, the velocity of the swirling air is damped more. If the eccentricity is excessively large, therefore, an intense swirling flow has to be generated, anticipating this damping, so that the intake port has its fluid resistance increased. The inequality $Os/D > 0.15$ is not practical because the damping of the swirling flow is remarkably increased. For small eccentricities, on the other hand, the asymmetry of the squish flows is so insufficient as to achieve no effect. For a ratio smaller than 0.015 to 0.02 there does not arise such asymmetry as can produce a practical effect.

The present invention can adopt the following modes of operation or characteristic features when practiced.

According to a first operational mode, as shown in FIGS. 2 (A) and (B), the fuel injection nozzle is made operative to inject a fuel spray within an angular range of circumference of 225 degrees, whose value represents the addition of an angle of 45 degrees directed into the opposite direction of the swirling flow Sw formed in the cavity C to a semicircle at the eccentric side of the cavity C determined by a straight line extending through the cavity center and intersecting the straight line joining the center Op of the piston P and the center Oc of the cavity C at a right angle.

This first operational mode is concerned with the region in the cavity C into which the fuel spray is to be injected, and has an advantage in that if the position of the injection port of the fuel injection nozzle and the pattern of the fuel spray are adjusted to distribute the fuel spray in the region of the circumferential angle of the aforementioned cavity C, the position of the fuel spray can be effectively controlled by the differences in the squish flows. More specifically, since the fuel spray can brought as close as possible to the inner wall of the cavity C, while being prevented from contacting with the inner wall, and can be prevented from being distributed over the center Oc of the cavity C, this first operational mode has an advantage in that an overrich region of fuel is prevented from being formed, thereby suppressing the smoking phenomenon.

According to a second operational mode of the present invention, as shown in FIGS. 3(A) and (B), the cavity formed in the piston top surface has its inlet opening restricted, and its remaining portion is allowed to have a larger area such that the ratio of the inlet opening area A to the piston top surface area Ao satisfies the following relationship:

$$0.07 \leq A/Ao \leq 0.25.$$

This second operational mode has an advantage in that, since the intensities of the flows into the cavity C, i.e., the squish flows S, are determined by the ratio (i.e., the throttle ratio) of the opening area A of the cavity C to the area Ao of the piston P, the differences in the intensities of the squish flows can be made to act more effectively if the ratio is set within the above-identified range.

A third operational mode or characterizing feature of the present invention is concerned with the concept that the fuel injection nozzle is made operative to inject the fuel spray within a range of 90 to 180 degrees in terms of the angle of circumference of the cavity C, and has an advantage in that the fuel spray can be carried in the swirling flow formed in the cavity C and can be dispersed over the entire circumference of the cavity C to thereby form a satisfactory air-fuel mixture.

A fourth mode or element of the present invention is directed to the concept that the fuel injection nozzle is made operative to conduct the injection at a spray angle such that the most divergent portion of the fuel spray is confined between the center and inner the circumferential wall of the cavity. This has an advantage in that, since it is possible to prevent the fuel from impinging upon the circumferential wall of the cavity and to prevent the fuel from merging due to the fuel distribution over the central portion, it becomes possible to present any overrich region of fuel from being formed in the cavity to prevent smoking. The controlling operation of the position of the fuel spray due to the differences in the squish flows can be made more effective.

BRIEF DESCRIPTION OF THE DRAWINGS

FIGS. 4 to 6 illustrate the internal combustion engine according to an embodiment of the present invention and its operation, wherein FIG. 4 is a longitudinal sectional view showing the internal combustion engine of the present invention and is a sectional view taken along line B—B of FIG. 5; FIG. 5 is a transverse sectional view taken along line A—A of FIG. 4; and FIG. 6 is a longitudinal sectional showing details of the swirl injection nozzle of the internal combustion engine.

DETAILED DESCRIPTION OF THE PREFERRED EMBODIMENTS

The present invention will now be described in the following in connection with an exemplitive embodiment thereof.

The direct injection internal combustion engine of a compression ignition type of this embodiment employs all of the first to fourth operational modes or elements of the present invention as described above, and is characterized by the generation of a swirling flow in the piston cavity, which is formed eccentrically of the center of the piston top surface; by the squish flow having locally different intensities into the cavity from about the circumference of the cavity; and by controlling the distributed position of the fuel spray, which is injected into the cavity, to prevent any overrich region of fuel from being established to thereby prepare a satisfactory mixture. The internal combustion engine according to this embodiment will be described in the following with reference to FIGS. 4 to 6.

Figure 1:
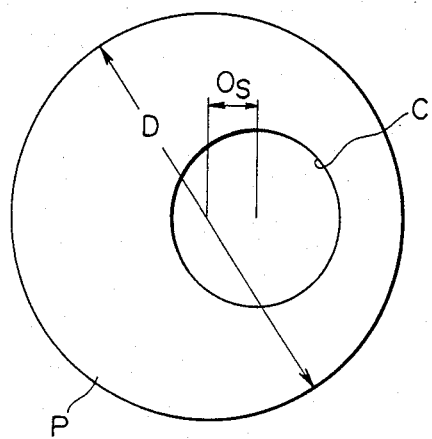
FIG. 1 is a schematic top plan view of a piston explaining the present invention.
Figure 2A:
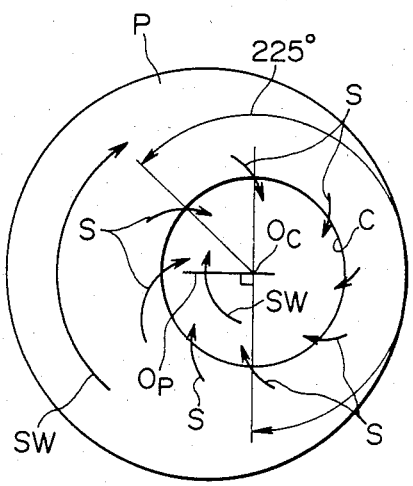
FIGS. 2(A) and (B) are top plan views of a piston explaining a first characteristic of the present invention.
Figure 2B:
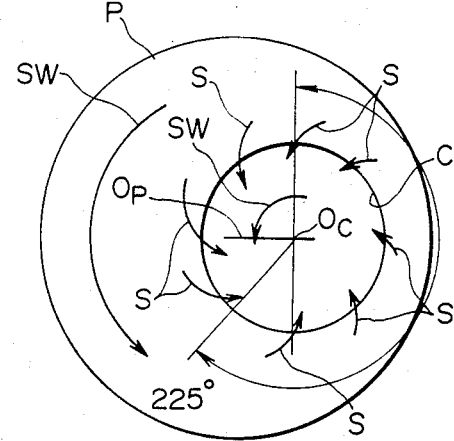
Figure 3A:
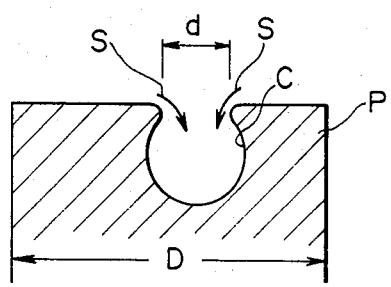
FIGS. 3(A) and (B) are a cross-sectional view and a top plan view of a piston, respectively explaining the relationship of the area ratio between the opening of the cavity and the piston top surface according to a second feature of the present invention, and illustrating the squish flow.
Figure 3B:
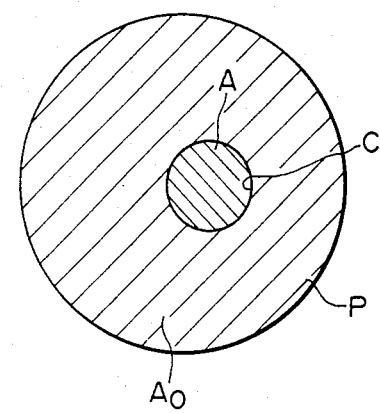
Figure 4:
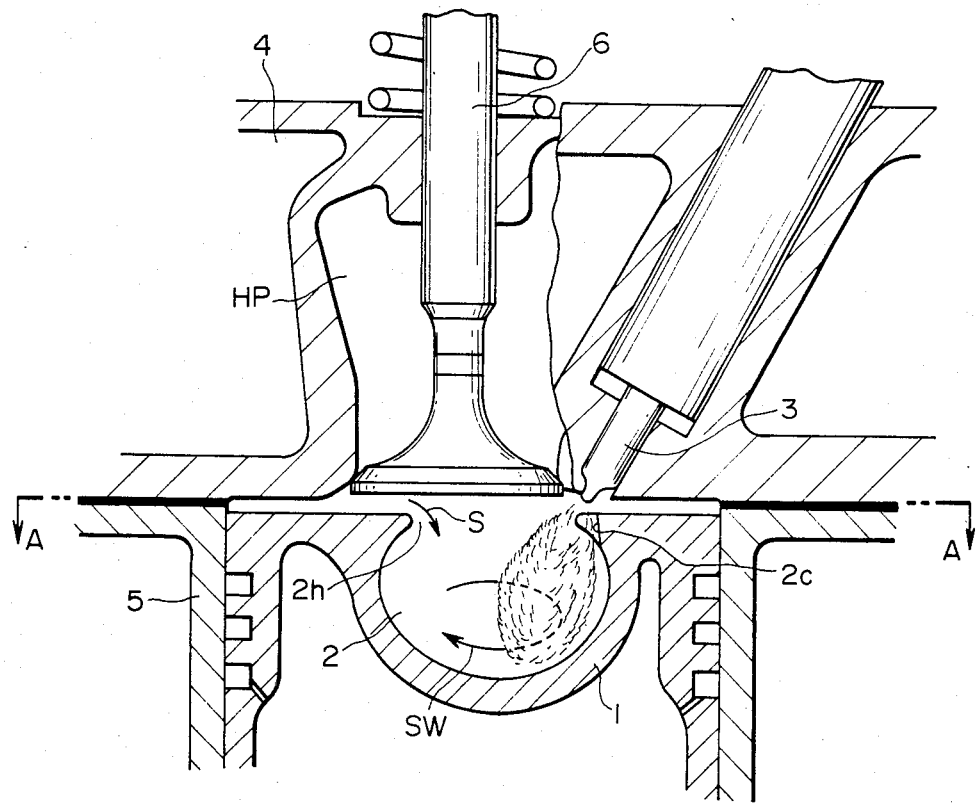

As shown in FIG. 4, a generally spherical cavity 2 is is formed so that its center is offset 3.5 mm from the center of the flat top surface of a piston 1 made reciprocally movable within a cylinder 5. The ratio of the eccentricity Os (=3.5 mm) to the diameter D (=84 mm) of the piston is about 0.042. The cavity 2 has its opening 2h formed with a notch 2C so as to avoid a collision with the fuel spray and the fuel nozzle body, and the area ratio A/Ao of the area A of the opening including the notch to the area Ao of the piston top surface is 0.13. Moreover, the diameter of the opening 2h of the cavity 2 is 0.7 to 0.8 of the maximum inner diameter thereof to thereby take into consideration the fact that the intake air in the cavity 2 may not flow onto the flat top surface of the piston 1 during the compression stroke.

The fuel injection nozzle is constructed, as a slit type swirl injection nozzle 3 which is arranged to extend through a cylinder head 4 and so as to have its injection port facing the notch 2C of the aforementioned cavity 2.

Figure 6:
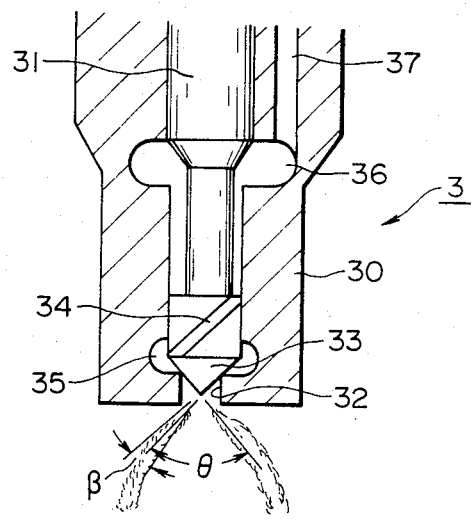

The swirl injection nozzle 3 is composed, as shown in FIG. 6, a nozzle body 30 having its leading end made of a slender, hollow cylindrical member, having a needle member 31 made of a stepped rod member inserted in the nozzle body 30. The nozzle body 30 has its leading end portion formed with a centrifugal chamber 35 coaxial with an injection port 32 which is opened into the centrifugal chamber. The needle member 31 has its conical needle tip 33 abutting against the injection port 32 to plug the same. The larger diameter portion forming the needle tip 33 is formed with a groove-shaped slit 34 which extends along the outer circumferential wall thereof at a predetermined angle with respect to the axis thereof, as shown in FIG. 6, to thereby provide communication between the centrifugal chamber 35 and a compartment 36 which in turn communicates with a fuel injection pump (not shown) by way of a fuel supply passage 37.

The swirl injection nozzle 3 forms a hollow, conical spray pattern, and the angle, cross-sectional area and length of the aforementioned slit, the size of the centrifugal chamber 35, and the diameter and length of the injection port 32 are determined with consideration being given to the distance from the center to the inner circumferential wall of the cavity, such that the spray angle $\theta$ shown in FIG. 6 may be 50 degrees. The diameter of the injection port 32 may preferably be 0.3 to 1.0 mm according to our experiments and is set at 0.6 mm in the present embodiment. The angle of thickness $\beta$ of the conical fuel spray shown in FIG. 6 cannot be made so large, and is selected within an angular range of 5 to 15 degrees.

Figure 5:
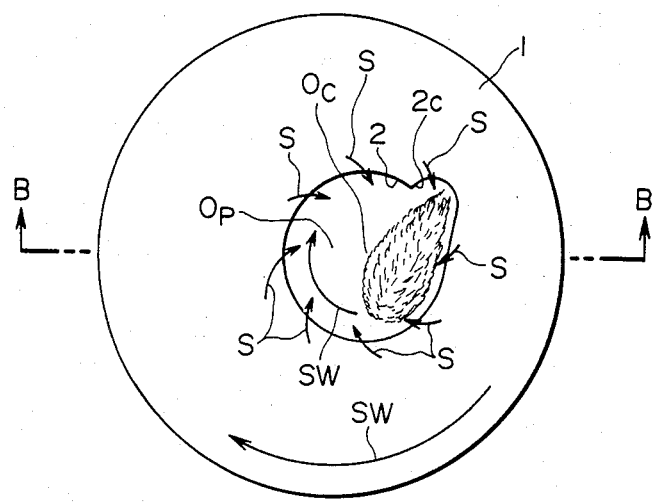

The fuel injection nozzle 3 injects the fuel spray over a range of 120 degrees of the circumference of the cavity 2 from its injection port, which faces the bottom portion of the notch 2C and is formed at a position 30 degrees to the horizontal direction of FIG. 5 in the opening 2h of the cavity 2.

An intake valve 6 and an exhaust valve are inserted and arranged in the cylinder head 4, as shown in FIG. 4. The intake passage, in which the intake valve 6 is arranged, is formed, as shown in FIG. 4, with a helical port HP which is tuned so as to generate a swirling flow having a predetermined swirl ratio (which is equal to 3 in the present embodiment).

In the direct injection internal combustion engine of a compression ignition type having the construction thus far described according to the present embodiment, the intake air, which receives a swirling force from the helical port HP, is compressed in accordance with the rise of the piston 1. In accordance with this rise of the piston, the swirling flow of the intake air has its swirling velocity properly suppressed due to the viscosity of the air and friction with the cylindrical wall. When the piston 1 approaches top dead center, i.e., comes a position between 20 and 5 degrees before top dead center, fuel injection is started with a hollow, conical three-dimensional spray pattern of a predetermined spray angle having a tangential velocity component until the spray reaches the vicinity of the inner wall surface of the opening of the cavity 2. Since the opening of the cavity 2 of the piston 1 is throttled around 10 degrees before top dead center, the fuel spray has its positional distribution controlled by the squish flows S, which flows from the flat surface of the piston 1 into the cavity 2 and which have locally different intensities, so that it is diffused and mixed over the whole of the cavity while being carried in the residual swirling flow, whereby the fuel spray forms a satisfactory air-fuel mixture over the entire volume of the cavity 2, while being evaporated by the hot air having been adiabatically compressed at the end of the compression stroke, until it is ignited.

The ignition starts from the vicinity of the inner wall surface of the cavity 2 and reaches the central portion of the cavity while being swirled by the swirling flow. When the piston 1 passes the top dead center position, the clearance between the flat surface of the top of the piston 1 and the lower wall surface of the cylinder head 4 is increased so that the vapors in the cavity 2 vigorously blow through the opening 2h until completely burned.

In the engine having the construction thus far described according to the present embodiment, in part by establishing a swirling flow in the cavity 2 by the action of the helical port HP, and in part by injecting a fuel spray of a weak penetration having a tangential velocity component in the forward direction of the swirling flow into the cavity having this swirling flow, the fuel spray is carried in the swirling flow and dispersed circumferentially throughout the cavity 2.

In the engine of the present embodiment, since the cavity 2 is formed eccentrically in the top surface of the piston 1, the positional distribution of the fuel spray, which has been injected from the fuel injection nozzle, in the cavity 2 is controlled by differentiating the intensities of the squish flows flowing circumferentially into the cavity 2 from different directions so that it may be distributed so as to approach the inner wall of the cavity but not contact the same and not pass over the center of the cavity, whereby the smoking phenomenon is prevented by preventing any overrich region of fuel from being generated.

Moreover, the swirling flow having a circumferential velocity component and the squish flows S having velocity components of different magnitude in the depthwise direction of the cavity 2 are made to properly collide upon each other within the cavity 2 so that the mixture between the fuel injected and the air is improved so as to form a satisfactory mixture.

Since a satisfactory mixture is formed over the entire volume of the cavity, as described hereinbefore, the direct injection internal combustion engine of the present embodiment has an advantage in that efficient combustion can be maintained with minimum fuel consumption while suppressing the emission of hydrocarbons, carbon monoxide and particulates, as well as the smoking phenomenon.

Generally speaking, the fuel injection timing of a compression ignition internal combustion engine is different from the ignition timing of a gasoline engine in that it is hardly varied in dependence upon the magnitude of the load but is advanced with an increase in the r.p.m. The width of this change is about 0 to 20 degrees in terms of the crank angle. If the ignition timing is advanced, the distance between the cavity C of the piston 1 and the injection port of the fuel injection nozzle is increased so that the fuel spray injected from the injection port has its distributed range enlarged so as to pass over the center of the cavity 2 to thereby invite the possibility that the fuel may be locally enriched, or may collide upon the inner circumferential wall. Even in this case, however, the internal combustion engine of the present embodiment has an advantage in that the region and position of the fuel spray are most properly controlled by the actions of the squish flows S having different intensities, to thereby obviate the foregoing problems.

Since there is no collision of the fuel spray upon the inner wall surface of the cavity 2 thanks to the use of the swirl injection nozzle 3 having weak fuel penetration, moreover, the internal combustion engine of the present embodiment has an advantage in that the fuel droplets do not become coarse and/or form a fuel film on the cavity wall. The swirl injection nozzle 3 has excellent fuel atomizing characteristics, and with turbulences being effectively formed by the squish flows S having different intensities, the combustion is further promoted to completion.

As a result, the internal combustion engine of the present embodiment has advantages in that it can remarkably suppress the smoking phenomenon and reduce the emission of hydrocarbons (HC), carbon monixide (CO), particulates and so on, and in that the fuel spray injected from the swirl injection nozzle 3 is carried by the squish flow and is continuously distributed to the vicinity of the inner wall surface of the cavity 2 whereby the ignition delay can be shortened while combustion noise is suppressed to a low level.

Since the internal combustion engine of this embodiment need not have a high compression ratio, furthermore, it has an advantage in that the engine friction is low, enhancing mechanical efficiency, whereby the specific fuel consumption is made low thanks to the aforementioned complete combustion.

Since no intense swirling flow needs to be formed to avoid the collision of the fuel upon the inner wall surface of the cavity because a swirl injection nozzle 3 having weak fuel penetration is used, and since the resistance of the helical port in the vicinity of the intake port and the intake valve to the flow can be reduced, the internal combustion engine is advantageous in that the charging efficiency ($\eta n$) of the intake air brought into the combustion chamber can be enhanced, whereby the flow rate of the intake air for a given cylinder volume can be increased to increase the quantity of the fuel burned for a given air excess ratio, whereby engine output power can be augmented.

Ordinary hole nozzles or pintle nozzles have strong penetration since the component in the injection direction (i.e., axial direction of injection port) of fuel spray constitutes its main velocity component. In contrast, the swirl injection nozzle 3 used in the present embodiment has an advantage of weak penetration since its velocity component is divided into components in the tangential direction and in the injection direction and thus the component in the injection direction becomes smaller and can be soon damped.

In the engine of the present embodiment, since the air has a slow swirling velocity at the central portion of the cavity but a higher velocity at the circumferential portion of the same, the mixture is desirably distributed either uniformly or thicker at the circumferential portion and thinner at the central portion. In the present embodiment, the fuel is injected in a hollow, conical fuel spray pattern from the swirl injection nozzle 3 so that it does not reside at the central portion of the cavity 2, where the swirling flow has a low velocity, but reaches the vicinity of the inner wall surface near the opening 2h of the cavity 2 thanks to the cooperation with the swirling flow formed in the cavity. Because of the weak penetration, however, the fuel does not collide upon the inner wall surface of the cavity. The mixing with the air and diffusing operations of the fuel droplets are conducted in the present embodiment by the actions of the squish introduced into the opening of the cavity with properly tuned different directional strengths. More specifically, the fuel droplets having reached the vicinity of the inner wall surface of the cavity 2 are guided in the depthwise direction along the inner wall surface of the cavity, while being mixed with the air by the squish flows, so that they are uniformly distributed in the cavity. The fuel spray in the vicinity of the inner wall surface starts to be ignited, while being evaporated by the hot air having been adiabatically compressed at the end of the compression stroke, from the circumference close to the inner wall surface, and the combustion promptly proceeds toward the center.

Since the fuel injection nozzle is arranged so as to be offset and inclined from the center of the cavity and since the intake valve and the exhaust valve used are both one in number, furthermore, the embodiment has an advantage in that it can be applied without any difficulty to a direct injection internal combustion engine of a small-sized compression ignition type such as is frequently equipped with one intake valve and one exhaust valve.

As has been described hereinbefore, the present invention should not be limited to the foregoing described embodiment. Any number of design changes and modifications can be made within the scope of the appended claims.

What is claimed is:

1. A direct injection internal combustion engine of a compression ignition type, in which a fuel is injected into air supplied into a combustion chamber and compressed by a piston so that the fuel may be ignited and burned, comprising:

intake means including means for supplying the swirling intake air into said combustion chamber;
   said combustion chamber comprising a substantially semi-spherical cavity formed in the top surface of said piston, the center of said cavity being offset with respect to the central axis of said piston top surface by an eccentricity Os as satisfies the following relationship, where D is the diameter of said piston, $$0.02 < Os/D < 0.15;$$

and fuel injection nozzle means for injecting a fuel spray having a large tangential velocity component with respect to the axis of an injection portion and an axial velocity along the forward direction of the swirling flow of intake air formed in said cavity.

2. A direct injection internal combustion engine of a compression ignition type as set forth in claim 1, wherein said fuel injection nozzle means comprises a fuel injection nozzle positioned with respect to said cavity to inject said fuel spray within an angular range of 225 degrees with respect to cavity circumference, whose value comprises the addition of a circumferential angle of 45 degrees oriented oppositely of the direction of said swirling flow formed in said cavity, to a semi-circle located on the eccentric side of said cavity and determined by a straight line extending through the cavity center and intersecting at a right angle the straight line joining the piston center and the cavity center.

3. A direct injection internal combustion engine of a compression ignition type as set forth in claim 2, wherein said fuel injection nozzle is positioned with respect to said cavity to inject said fuel spray within a range of 90 to 180 degrees in terms of the circumferential angle of said cavity.

4. A direct injection internal combustion engine of a compression ignition type as set forth in claim 1, wherein said fuel injection nozzle means comprises a fuel injection nozzle positioned with respect to said cavity to inject fuel with a spray diverging angle to cause the most divergent portion of said fuel spray to be confined between the central axis and an inner circumferential wall of said cavity.

5. A direct injection internal combustion engine of a compression ignition type as set forth in claim 1, wherein said fuel injection nozzle means comprises a fuel injection nozzle positioned with respect to said cavity to inject said fuel spray in a hollow conical configuration such that the outer boundaries of said conical configuration fall between said cavity central axis and an inner circumferential wall thereof.

6. A direct injection internal combustion engine of a compression ignition type as set forth in claim 1, said offset being sufficiently large to insure that squish flows whose strengths vary circumferentially of said cavity interact with said swirling flow such that an air-fuel mixture is formed in said cavity such that said fuel is prevented from colliding upon an inner circumferential cavity wall.

7. A direct injection internal combustion engine of a compression ignition type as set forth in claim 1, wherein said fuel injection nozzle means comprises a swirl injection nozzle positioned in the vicinity of a throttled inlet opening of said cavity.

8. A direct injection internal combustion engine of a compression ignition type as set forth in claim 7, wherein said swirl injection nozzle comprises a slit type swirl injection nozzle comprising a swirl injection nozzle of the slit type comprising a nozzle body of a hollow cylindrical body having a injection port at end portion thereof, a needle tip, having a groove-shaped slit extends along an outer circumferential wall thereof and a conical tip portion at end portion thereof, inserted into said nozzle body.

9. A direct injection internal combustion engine of a compression ignition type as set forth in claim 8, wherein the diameter of said injection port is within 0.3 mm and 1.0 mm.

10. A direct injection internal combustion engine of a compression ignition type as set forth in claim 1, wherein said intake means comprises a helical port positioned in the vicinity of a port of said intake means.

11. A direct injection internal combustion engine of a compression ignition type as set forth in claim 1, wherein the ratio eccentricity Os of said cavity and the diameter of said piston is 0.042.

12. A direct injection internal combustion engine of a compression ignition type as set forth in claim 1, wherein the cavity formed in said piston top surface has a throttled inlet opening, the remaining portion of said cavity being allowed to have a larger area, such that the ratio of the inlet opening area A to the piston top surface area Ao satisfies the following relationship:

$$0.07 < A/Ao < 0.25.$$

13. A direct injection internal combustion engine of a compression ignition type as set forth in claim 12, wherein said throttled inlet opening has a notch positioned at said throttled inlet opening of said cavity and in the vicinity of said nozzle, so as to avoid the collision of fuel spray and said nozzle body.

14. A direct injection internal combustion engine of a compression ignition type as set forth in claim 12, wherein the diameter of said throttled inlet opening is from 0.7 to 0.8 of the maximum diameter of said cavity.

* * * * *